Patented Apr. 9, 1935

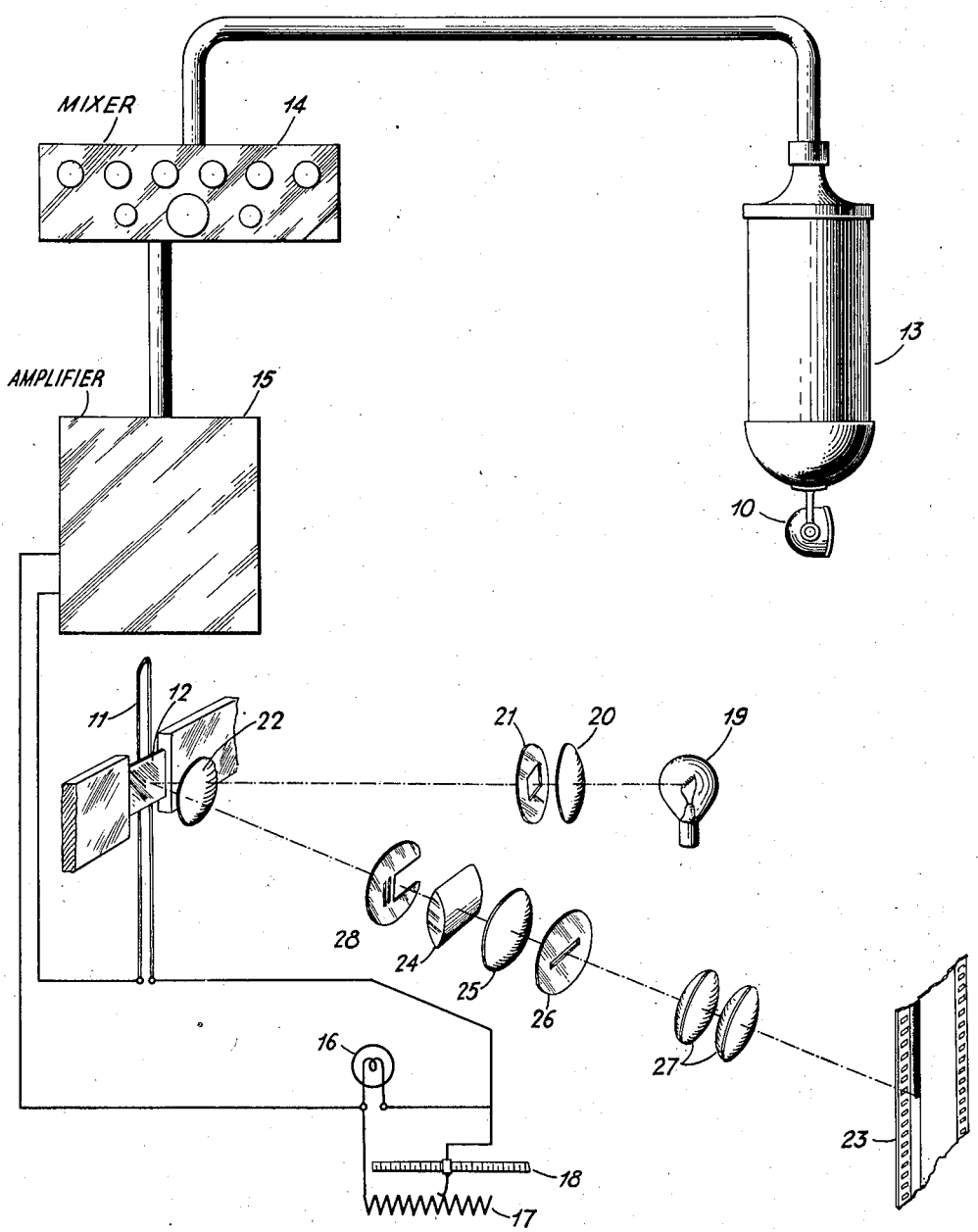

1,997,024

UNITED STATES PATENT OFFICE 1,997,024

RECORDING OF ELECTRICAL IMPULSES

Percival J. Townsend, Los Angeles, Calif., assignor to Radio-Keith-Orpheum Corporation, a corporation of Maryland Application July 28, 1932, Serial No. 625,301

2 Claims. (Cl. 179—100.3)

This invention relates to the recording of electrical impulses on a photographic film or the like, and has for its principal object the provision of an improved apparatus and method of operation whereby the effect of change in impulse amplitude is so modified as to keep the record within the limits of a predetermined area or track.

An auxiliary object is the provision of an improved sound recorder wherein the response of the recording element is rendered more or less independent of change in the amplitude or loudness of the sound impulses to be recorded.

A further object is the provision of means for automatically preventing over-shooting of the sound track edges when the volume of the recorded sound is high.

In the recording of sound, such as music, the recorder is ordinarily adjusted so that the recording beam covers one half the track on which the sound is to be recorded. In the case of a variable area record, zero modulation results in a track which is one half black and one half white. As the volume or amplitude of the sound increases, the vibratory motion of the recording beam across the record increases in magnitude and overshooting of the record edges is likely to result. This difficulty has heretofore been avoided by manually decreasing the gain of the amplifier when the volume is high and vice versa. Such procedure, however, requires great skill on the part of the recordist and is not altogether satisfactory because of inaccuracy in interpreting the effect which should be produced. In accordance with the present invention, these difficulties are avoided by including in the recording element circuit a device which absorbs the excess voltage at high amplitude of the recorded impulse, thus preventing over-shooting and ensuring proper regulation.

My invention will be better understood from the following description when considered in connection with the accompanying drawing, and its scope will be pointed out in the appended claims:

The single figure of the drawing illustrates a sound recording apparatus wherein the invention has been embodied.

This apparatus includes a microphone 10 and a galvanometer coil 11 upon which is mounted a vibratory mirror 12. Current is transmitted from the microphone 10 to the coil 11 through an amplifier 13, a mixer 14, an amplifier 15, and a control device shown as including an incandescent lamp 16, an adjustable resistor 17 connected in shunt to the lamp 16, and a graduated scale 18 arranged to cooperate with the movable contact of the resistor 17. Light is transmitted to the mirror 12 from a light source 19 through a lens 20, a stop 21 and a lens 22. Light is reflected from the mirror 12 to a record 23 through the lens 22 a cylindrical lens 24, a spherical lens 25, a light slit member 26 and an objective 27.

As previously indicated, it has heretofore been customary to control the current supplied to the coil 11 by variation in the gain of the amplier 15. Thus, when the volume of the sound to be recorded was high the gain of the amplifier was decreased and vice versa. This method of control had the disadvantage that the recordist was not always successful in following changes in the volume of the sound and the desired artistic effect was destroyed.

In the operation of the apparatus disclosed by this application the lamp 16, which may be provided with a filament of tungsten or the like, functions automatically to prevent undue increase in the current of the recording element 11 and the resultant overshooting of the sound track on the record 23. This operation, of course, depends on the change in resistance drop of the lamp with variation in amplitude of the current passing through its metal filament. It is apparent that a like result might be produced by connecting a carbon filament lamp in shunt with the recording element 11 of the galvanometer.

The scale 18 is provided to facilitate adjustment of the apparatus. It may be calibrated in decibels or percentages so that adjustment is readily made for recording at any desired level.

While the invention is described as utilized in the recording of sound, it will be apparent that it also has utility where a record of electrical impulses must be maintained within a prescribed area irrespective of change in amplitude.

Having thus described my invention, what I claim is:

1. The combination of a circuit including a recording element and a source of electrical impulses to be recorded, positive temperature coefficient means connected in series with said element for maintaining at said element a predetermined level of said impulses, and resistance means connected in shunt to said positive temperature coefficient means for adjusting said level.

2. The combination of a recording galvanometer including a vibratable mirror, a source of sound-modulated electrical impulses arranged to control the vibrations of said mirror, resistance means having a positive temperature coefficient responsive to the amplitude of said impulses for maintaining the vibrations of said mirror within a predetermined range and connected in series with the said galvanometer, adjustable resistance means connected in shunt to said first resistance means for adjusting said range, means for applying a light beam to said mirror, and means for transmitting the reflected image of said beam to a light sensitive record.

PERCIVAL J. TOWNSEND.